MAGNETIC LOGIC CIRCUIT

Filed Aug. 22, 1963

2 Sheets-Sheet 1

DAVID R. BENNION
WILLIAM K. ENGLISH
DAVID NITZAN
INVENTORS

BY Samuel Lindenberg

ATTORNEY

MAGNETIC LOGIC CIRCUIT

Filed Aug. 22, 1963 2 Sheets-Sheet 2

DAVID R. BENNION
WILLIAM K. ENGLISH
DAVID NITZAN
INVENTORS

BY Samuel Lindenberg
ATTORNEY 3,322,965
MAGNETIC LOGIC CIRCUIT

David R. Bennion and William K. English, Menlo Park, and David Nitzan, Palo Alto, Calif., assignors to AMP, Incorporated, Harrisburg, Pa.

Filed Aug. 22, 1963, Ser. No. 303,826
19 Claims. (Cl. 307—88)

This invention relates to magnetic core devices useful in performing logical functions and more particularly to improvements therein.

Magnetic core logic has gained acceptance in, for example, the field of computers, wherein many logical devices are employed. The usual approach to obtaining the logical operation required, where an output is a function of two input variables, is to use three magnetic cores, preferably of the multiaperture type, and to wire these cores together with coupling loops and driving windings all with a coupling sense such that the desired logical function is accomplished by inspecting the state of remanence of the third, or output core, which results after input drives to the two input cores.

For performing complex logic using known magnetic logic structures it has been necessary to operate the structures sequentially, using complex writing and a large number of cores.

An object of this invention is the provision of a magnetic core logical arrangement which simplifies the required winding arrangement for the performance of said logic.

Another object of the present invention is the provision of a magnetic core logical arrangement which reduces the requirement for many sequential operations for achieving results.

Yet another object of the present invention is to provide a basic arrangement of cores which with a simple change in wiring can perform a multiplicity of different logical operations.

Still another object of the present invention is the provision of a novel and useful magnetic core system for performing logical functions.

These and other objects of this invention may be achieved by basically using three multiaperture cores as the respective two input and output devices and a fourth core which is a simple toroidal core, and which is called a "source core." Logic may be performed by varying the sense of the couplings and/or numbers of turns of a winding which couples output legs of the two input cores together with the source core to the input legs of the output core. The general technique employed is that of the MAD–R (multiaperture device resistance) systems of the type shown in U.S. Patent No. 2,995,731 to Joseph P. Sweeney.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 2:
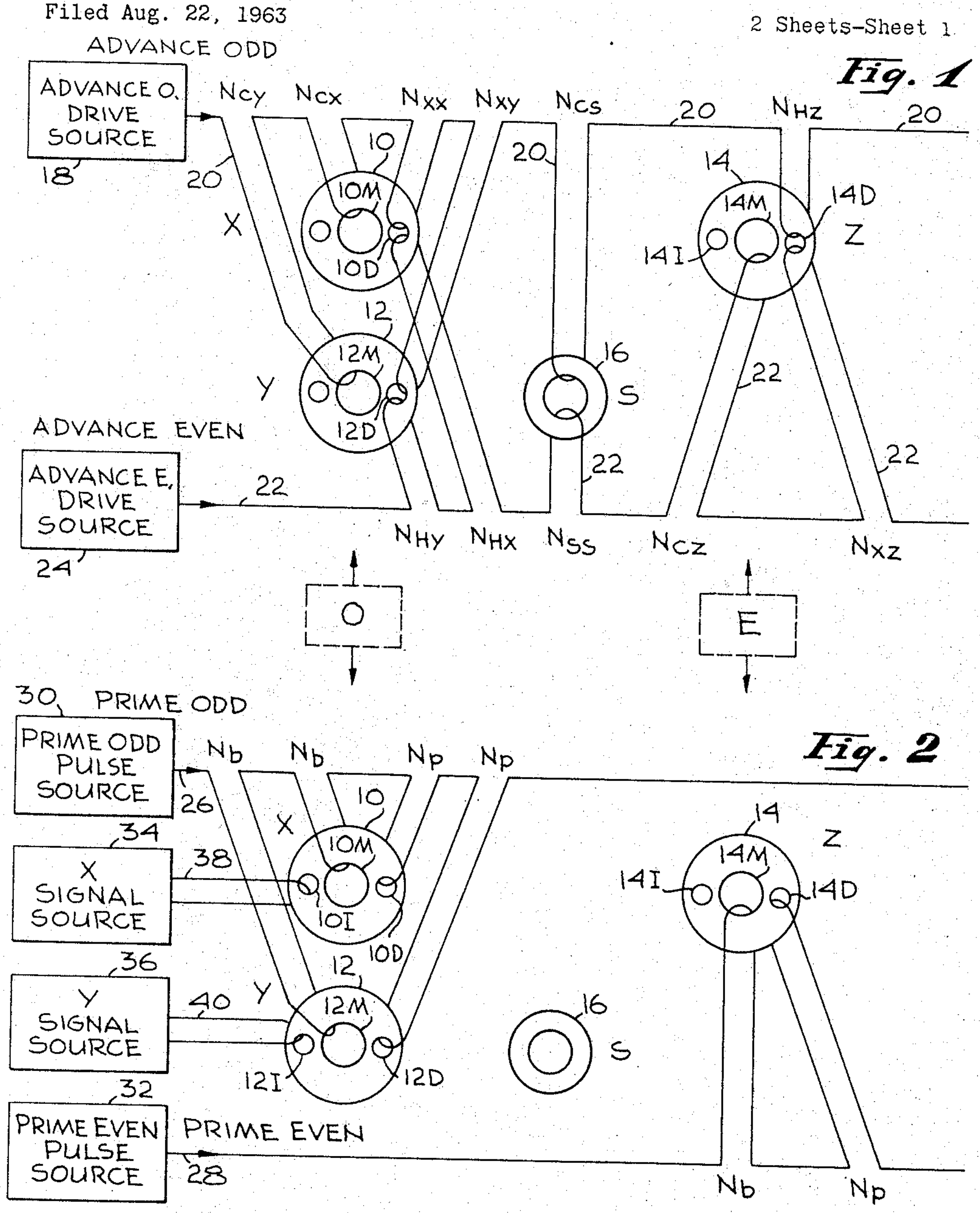
FIGURE 1 shows a typical drive winding arrangement for magnetic cores which may be employed with this invention.
FIGURE 2 shows a typical priming winding arrangement for the magnetic cores which are employed in accordance with this invention.

In order to preserve clarity in both the drawings and description of this invention, there is shown in the two separate circuit diagrams of FIGURE 1 and FIGURE 2 a typical arrangement of the driving windings which may be used with the magnetic cores forming the logical operations. The circuit diagrams which follow show the coupling winding between the cores which may vary in accordance with the logic to be performed. The driving windings do not vary however.

In accordance with this invention and as shown in FIGURE 1, basically four magnetic cores are employed. Three of these respectively 10, 12, 14 are multiaperture cores of the type which have a central or main aperture 10M, 12M, 14M and one or more terminal apertures. The source core 16 is a simple toroidal core which is supposed to provide a flux output equivalent to the output flux which is derived from the magnetic material surrounding one of the terminal apertures of either core 10 or core 12. Thus the source core 16 may be smaller than the multiaperture cores.

An advance odd drive source 18 applies a drive pulse to an advance drive winding 20 at intervals which alternate with the current drive applied to an advance even drive winding 22 from an advance even drive source 24. The advance odd driving winding 20 is used to drive the cores 10, 12 to their clear states. This is effectuated by a coupling to the cores in which the winding 20 passes through the main apertures 10M, 12M of cores 10, 12. The winding then successively passes through the output terminal apertures 100, 120, of cores 10, 12 for the purpose of assisting in the transfer of flux by providing MMF for bucking the MMF due to currents in the output windings of these cores. The advance odd drive winding 20 then passes through the aperture of the source core 16 to drive it to its clear state. The advance odd winding 20 then passes through the output aperture 140 of the core 14 to also serve here as a holding winding against any effects on this core due to currents in the output winding coupled to succeeding cores.

The advance even winding 22 first serves as a hold winding for the odd cores, similar in function to the holding function performed by winding 20 on the even core 14. Thus the winding 22 is coupled to cores 10, 12 passing through the output apertures 100, 120 and thereafter is coupled to source core 16, passing through the aperture of the source core with a winding sense to drive this source core to its One or Set state of magnetic remanence. The winding is coupled to core 14 for clearing it, thereafter passing through the main aperture of the even core 14. Thereafter the winding 22 passes through the output aperture 140 of the core 14 for the purpose of providing MMF bucking the MMF due to currents induced in the output winding of that core.

FIGURE 2 is a circuit diagram showing how the priming windings are coupled to the cores. Two priming windings, respectively a prime odd core winding 26 and a prime even core 28 are employed. The prime odd core winding 26 has current pulses applied thereto from a prime odd pulse source 30. The prime even winding 28 has current pulses applied thereto from the prime even pulse source 32. The prime odd winding first passes through the respective main apertures 12M and 10M of cores 12 and 10 to provide a prime bias whereby priming current tolerances are increased. The priming winding 26 then passes through the respective output apertures 100 and 120 of the odd cores 10 and 12. Thereafter it proceeds to any subsequent core logic circuit arrangement (not shown). The prime even current winding 28 first passes through the main aperture 14M of core 14 to provide priming bias to increase the prime current tolerance in the core. Thereafter the prime even winding passes through the output aperture 140 to apply priming current thereto. The priming winding can then extend to other cores as required.

The input signals to the cores 10 and 12 respectively on which a logical operation is to be performed are applied from an X signal source 34 and from a Y signal source 36. The X signal source is coupled through input winding 38 to the input aperture 10I of the core 10. The Y signal source is coupled through an input winding 40 which passes through the input aperture 12I of the core 12. The X and Y signal sources are representative of any suitable inputs to the magnetic core logic circuit of this invention. The application of input signals to the input apertures should also be considered by way of example, since it is well known to apply an input to magnetic cores through their central apertures also.

The drive current program or sequence for the logic circuit in accordance with this invention may proceed as follows: First there is an advance even pulse drive applied to the winding 22 which places the source core 16 in its set state of magnetic remanence. During a data input interval the X and Y signal sources, or both, are energized in response to which either or both of the cores 10 and 12 are driven to their set states of magnetic remanence. The "data input interval" can occur either simultaneous with the advance even pulse interval or before the following drive interval. Next, the prime odd pulse source 30 applies a current pulse to the prime odd winding 26 in response to which either or both of the cores 10, 12 are primed depending upon the state of magnetic remanence of these cores at the time of the occurrence of the priming current.

The next signal to occur is a current pulse from the advance odd drive source 18 which is applied to the advance odd core winding 20. This serves to drive cores 10, 12 and 16 to their clear states in response to which a logical operation is performed, as determined by the manner of the coupling of the transfer winding, not shown in FIGURES 1 and 2, which couple cores 10, 12, 14 and 16. The next current pulse to occur is provided by the prime even pulse source 32 which primes core 14 if it is in its set state at the time of the occurrence of the priming pulse. Thereafter, the advance even drive source 24 is energized, applying a pulse of current to the winding 22 whereby core 16 is driven again to its set state of magnetic remanence and core 14 is driven to its clear state, in the course of which an output is derived from this core indicative of the logical operation which has occurred.

Figure 3:
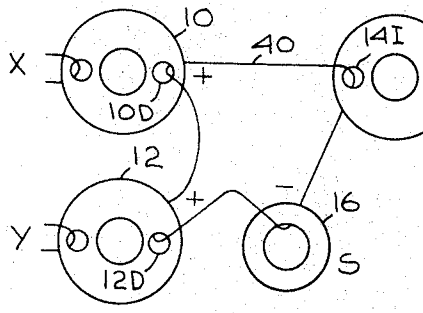
FIGURE 3 is a circuit diagram of an arrangement in accordance with this invention for performing And logic.

Reference is now made to FIGURE 3 of the drawings which is a circuit diagram of an arrangement in accordance with this invention for providing a function commonly termed an And function. This may be expressed by the logical equation $Z=X.Y$. X and Y respectively represent the inputs to cores 10 and 12 and Z represents the resultant state of the output core 14. Effectively what is represented by this equation is that if the inputs to cores 10 and 12 during the data input interval have resulted in driving them to their set states after which they were primed, prior to the operation of the clear odd pulse source, then an output may be dervied indicative of this core from 14.

This logical operation occurs because of the manner in which the four cores are coupled by the transfer or output winding 40. This winding is coupled to cores 10 and 12 by passing through their output apertures 100, 120, with the same relative winding sense. Thereafter, the transfer winding 40 couples to the source core 16 by passing through its aperture with a winding sense so that a current induced in the winding from the source core opposes the currents induced in the winding from the respective cores 10 and 12. The winding then couples to the core 14 by passing through its input aperture 14I with a winding sense to drive core 14 to its set state as a result of an output which may be received from either core 10 or core 12.

In operation, in response to energization of the advance odd core winding, core 14 is driven to its set state only if both cores X and Y had received an input previously. An output from either of these cores alone is insufficient to overcome the output derived from the source core which opposes the outputs from the cores 10 and 12. As previously indicated, when the advance even winding 22 is driven by the output of the advance even drive source 24, the presence or absence of an output on output winding 42 indicates whether or not the input conditions specified by the manner of the coupling of the transfer winding 40 has been met.

Figure 4:
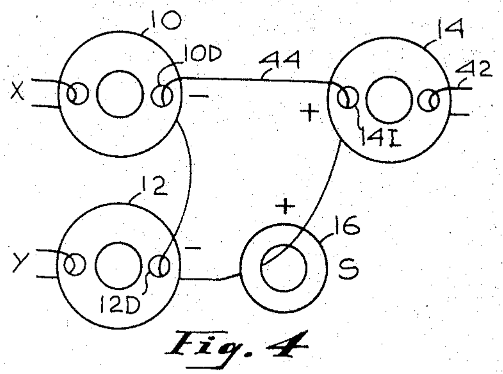
FIGURE 4 is a circuit diagram of an arrangement of magnetic cores in accordance with this invention for performing Nor or "not X and not Y" logic.

FIGURE 4 is a circuit diagram of an arrangement for accomplishing negation logic of the type which may be expressed by the logical equation $Z=\overline{X}.\overline{Y}$. This equation indicates that an output will be obtained from its core 14 if and only if, no inputs were applied to cores 10 and 12 during the input drive time. This is accomplished by the manner of the coupling of the transfer winding 44 to the cores 10, 12, 14 and 16. The transfer winding is coupled to cores 10 and 12 through their output apertures and to core 14 through its input aperture with a winding sense such that an output from either or both causes a current to flow in the winding 44 in a direction to drive core 14 toward its clear state of magnetic remanence rather than toward its set state of magnetic remanence. The sense of the winding coupling on cores 16 is such that the current induced in the winding 44 by the clear drive applied to the source core will drive core 14 to its set state of magnetic remanence, in the absence of an output induced in the winding 44 from either or both of the cores 10, 12. Here again the current induced in the transfer winding from the source core opposes any current induced in the transfer winding from the cores 10, 12, if they were in their primed states at the time of the application of a drive current to the clear odd winding. If neither of the cores were in their primed states, then the only current in the transfer winding will be that from the source core 16.

Figure 5:
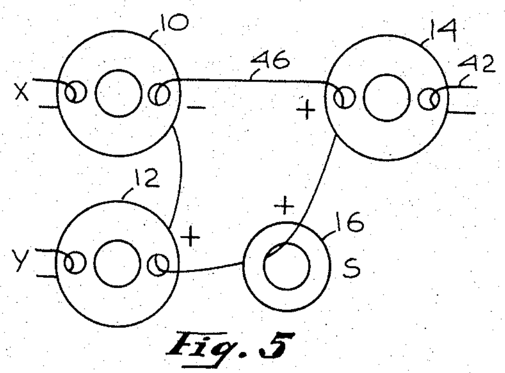
FIGURE 5 is a circuit diagram of an arrangement of cores in accordance with this invention for performing "not X or Y" logic.

FIGURE 5 is a circuit diagram illustrating how the transfer winding 46 may be coupled to the cores 10, 12, 14 and 16 in a manner so that the output of the core 14 will indicate the Or function of Y and the negation of X. The logical equation for this operation is $Z=\overline{X}+Y$, where $\overline{X}$ represents no input to core 10 and Y represents an input to core 12. Here the transfer winding 46 is coupled to the core 12, 14 and 16 with a winding sense such that an output from cores 12 and 16 tends to drive core 14 to its set state of magnetic remanence. The sense of the coupling of winding 46 on core 10 is such that an output induced in this winding from core 10 tends to drive core 14 to its clear state. In operation, should there not have been any input applied to the core 12 then the outputs from cores 10 and 16 cancel one another and core 14 is left in its clear state at the time of the drive to the clear odd winding. Should an input have been applied to both cores 10 and 12 then, although the outputs from cores 10 and 12 cancel one another or oppose one another, the excess output from the source core 16 will drive core 14 to its set state of magnetic remanence. Should no input have been applied to either core 10 or to core 12 then upon the clear odd pulse driving time occurring, core 14 will be driven to its set state of magnetic remanence in response to the output induced in the winding from the source core 16. Accordingly, the core 14 will indicate by an output whether or not an input has been applied to core 12 during the preceding data input time, or whether no input has been applied to core 10 during the preceding data input time.

Figure 6:
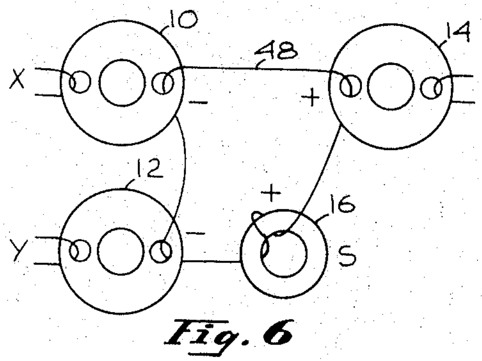
FIGURE 6 is a circuit diagram of an arrangement of cores in accordance with this invention for performing "not X or Y" logic.

FIGURE 6 is a circuit diagram of an arrangement for using magnetic cores and wire for achieving a logical operation which may be specified by the equation $Z=\overline{X}+\overline{Y}$. That is, an output Z is obtained from the magnetic core 14 when no X input or no Y input has been applied to the magnetic cores 10 and 12 during the data input time. The transfer winding 48 enables this logical function to be performed. It is coupled to the cores 10 and 12 by passing through their output apertures with a winding sense such that any voltage which is induced therein results in the core 14 being driven further into its clear state in response to the current drive which occurs as a result. The winding 48 on the core 16 has twice the flux linkage capacity as either core 10 or core 12 and its sense is such that the output from this core, which is induced in the transfer winding 48 during the clear odd core drive time, will drive core 14 to its set state. Core 14 accordingly is driven to its set state under any condition except when there is an input to both cores 10 and 12.

Figure 7:
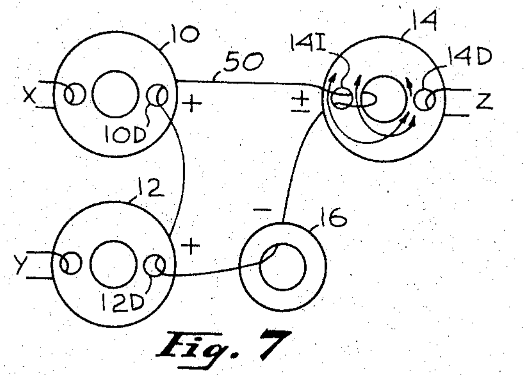
FIGURE 7 is a circuit diagram of an arrangement of magnetic cores in accordance with this invention for performing inverse exclusive Or logic.

FIGURE 7 is a circuit diagram illustrating how using the magnetic core and coupling loop arrangements one may obtain an inverse exclusive or function which may be expressed logically as $Z=XY+\overline{X}\overline{Y}$. This means that an output can be derived from core 14 when there has been an input to both cores 10 and 12 during the data input interval, or there has been an input to neither core during the data input interval. But no output can be obtained from core 14 when there has been an input to either core 10 or 12 alone during the data input interval. The transfer winding 50 provides this logical function by being coupled to the cores 10 and 12 and 16, passing through core 10 and 12 output apertures respectively 100, 120 with the same relative winding sense and then by passing through the aperture of the source core 16 with an opposite relative winding sense whereby the voltages induced in the transfer winding as a result of the drive on all of these cores during the clear odd drive interval are in opposition to one another.

The coupling of the winding 50 on the core 14 may be termed a figure eight coupling. The winding passes along the outer leg of core 14 adjacent input aperture 141 around the inner leg adjacent the aperture and then back through the input aperture and adjacent the outer leg again. By this figure eight winding, a current flowing through the transfer winding 50 in either direction will drive core 14 to its set state. The current flowing in which may be assumed to be a positive direction, will place the core in its set state by altering the direction of the flux around the outer leg adjacent aperture 141 and around the central aperture through the inner leg adjacent aperture 140. Current in the opposite direction alters the direction of flux in core 14 in the magnetic material adjacent to the central aperture which includes both inner legs of material adjacent the two minor apertures.

Assume now during the data input interval both cores 10 and 12 are driven to their set states by the inputs X and Y. Core 16 has been placed in its set state by the preceding clear even core drive. On the next clear odd core drive the output from core 16 in the transfer winding 50 cancels one of the outputs from cores 10 and 12. However, the remaining output from the two cores will drive core 14 to its set state.

Assume that during the data input interval no input was applied to cores 10 and 12. On the next clear odd core drive interval an output is induced in the transfer winding 50 from the source core 16. This will set core 14.

Assume that during the data input interval either core 10 or core 12 was driven to its set state of magnetic remanence. Then on the next drive odd core interval, the output from source core 16 which is induced in the winding 50 will be cancelled by the output from the one of the two cores 10, 12 which was driven to its set state. Thus the core 14 will have its state of magnetic remanence unaffected during the clear odd core drive interval.

Figure 8:
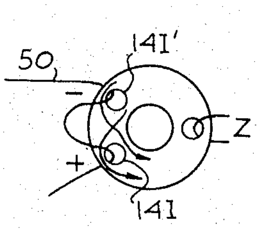
FIGURE 8 is a circuit diagram of an alternative method of coupling an input winding on the output core in FIGURE 7.

FIGURE 8 is a circuit diagram of an alternative arrangement for coupling the transfer winding 50 to the core 14 in order that core 14 be driven to its set state regardless of the direction of flow or polarity of the current flowing in the transfer winding 50. Another terminal aperture 14I' in the multiaperture core is employed. The transfer winding 50 passes up through the terminal aperture 14I making as many turns as are required for achieving the required magnetomotive drive around the outer leg, and then passes down through the terminal aperture 14I' similarly being coupled therethrough around the outer leg of material adjacent the aperture 14I'. Since the sense of the couplings to these two apertures is opposite, a current flowing through the transfer winding 50 of sufficient amplitude will drive the magnetic core 14 to its set state regardless of the direction of flow of this current.

Figure 9:
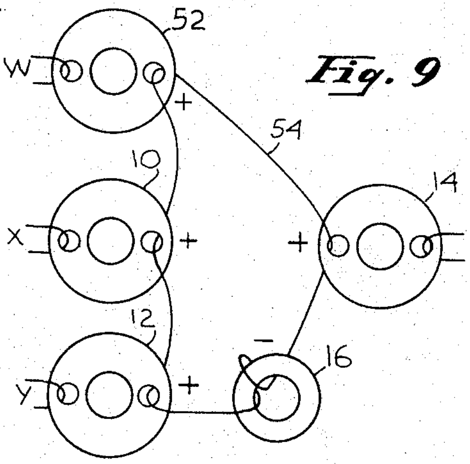
FIGURE 9 is a circuit diagram illustrating how the principles of this invention may be extended to three or more input variables.

FIGURE 9 illustrates how the embodiment of this invention may be extended to three or more variables. Assume that it is desired to have an And function which may be expressed as $Z=W.X.Y$. In other words, an output is desired from core 14 only if during the data input interval an input was applied to cores 10, 12 and core 52, which receives the input W. Core 52 is identical with cores 10 and 12. This logical function may be accomplished by coupling the transfer winding 54 to all of the output apertures of cores 10, 12 and 52 with the same relative winding sense and on the core 14 with a winding sense such that the current induced in the transfer winding 54 will tend to drive core 14 in its set direction of magnetic remanence. The winding 54 is coupled on core 16 with a sense opposite to that of the coupling of winding 54 on the cores 10, 12 and 52. Also, the number of turns of the winding 54 on the core 16 are made sufficient in number so that the voltage induced in that winding when core 16 is driven to its clear state will cancel the voltage induced in that winding in response to any two of cores 10, 12 and 52 being driven to their clear states from their primed states. Accordingly, should an input have been applied to any one or any two of cores 10, 12 and 52 during the data input interval, this will be cancelled by the output from the source core and the core 14 will have its state of magnetic remanence left unaffected. Only when the three input cores are driven to their set states of magnetic remanence during the data input interval will a sufficient current flow in the winding 54 on the subsequent clear odd core interval to drive core 14 to its set state of magnetic remanence.

By using the flux source core to provide flux sources or voltages for opposing or assisting the flux sources or voltages (each one of which may be chosen to be positive or negative polarity) from the data receiving cores with the value of the flux source obtained from the flux source core being multiples of the values of the flux from the other cores, many majority logical functions may be realized. The number of functions may be increased still further by allowing the transfer winding which is coupled to the data receiving core to be a figure eight or two-aperture winding as shown in FIGURE 7 or FIGURE 8, respectively.

Figure 10:
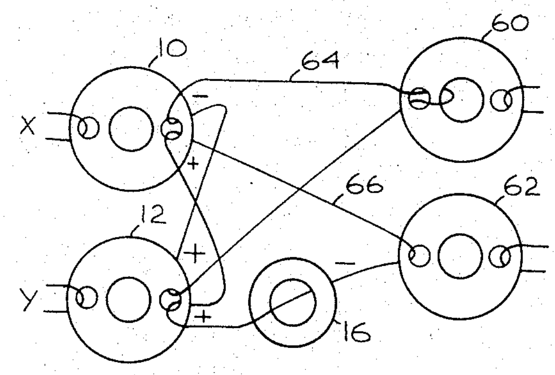
FIGURE 10 is a circuit diagram of an arrangement in accordance with this invention illustrating how the principles of this invention may be employed for a parallel fan-out circuit.

FIGURE 10 is a circuit diagram of a magnetic core arrangement which may be termed parallel fan-out. This magnetic core arrangement permits more than one logical function to be accomplished by using more than one transfer winding. The data input core and the source core in FIGURE 10 are given the same reference numerals as the corresponding cores in the preceding figures since they accomplish the same function. Two output cores are employed respectively 60, 62. Each one of these provides an output when the input logic corresponds to the logic specified by the manner of the couplings of the two associated transfer windings respectively 64, 66.

The transfer winding 64 is coupled to the output apertures of cores 10 and 12 with a relatively opposite winding sense and is coupled to the input of core 60 with a figure eight type of winding as described previously. The logical function which is performed by this arrangement may be shown as $Z=X\overline{Y}+\overline{X}Y$. That is, an output will be derived from the magnetic core 60 in the presence of an input to either of core X alone or core Y alone during the data input interval. An input to both cores during the data interval results in a cancellation of the output of both cores because of the opposite winding sense of the transfer winding 64 on both cores. The figure eight coupling of the winding 64 on the core 60 results in core 60 being driven to its set state during the clear odd core interval regardless of the direction of current flow through the transfer winding 64.

The logic specified by the manner of winding core 66 is that of an And gate. Thus core 62 will provide an output $U=X.Y$. That is, when an input has been applied to both cores and X and Y during the data input interval, then an output will be derived from core 62. Core 62 will not provide an output in the presence of an input to either one of cores 10 and 12 alone or to neither of these. The logical coupling of the winding 66 to the cores 10, 12, 16 and 62 is the same as was shown and described in FIGURE 3. The sense of the coupling on cores X and Y of transfer winding 66 is the same and is in the direction so that core 62 will be driven to its set state in response to the current which flows in the transfer windings from these cores being driven. The sense of the coupling on core 16 of the transfer winding 66 is opposite. Therefore, output from this core will cancel the output from one of the other two cores, thus requiring both cores to be in their set states before core 62 can be driven to its set state.

There has accordingly been described and shown herein a novel, useful and unique magnetic core-wire structure for accomplishing a multiplicity of logical functions in a very simple manner. Because of the use of a source core for establishing a flux threshold for driving a receiver or output core, the number of input variables each of which is represented by a magnetic core, can vary as required. Variations in logic are handled by varying the coupling sense of the transfer winding coupling to the data input cores, the source core and the output core as well as the number of winding turns thereon. Furthermore, more than one logical operation may be accomplished by using more than one transfer winding coupled to an output winding.

We claim:

1. A logical circuit arrangement for obtaining a predetermined output function of input variables, comprising a plurality of magnetic cores each having a first state of magnetic remanence and being drivable therebetween, first means for applying a first input to a first of said magnetic cores for affecting its state of magnetic remanence in response thereto, second means for applying a second input to a second of said magnetic cores for affecting its state of magnetic remanence in response thereto, means for driving said first, second and a third core to their first state of magnetic remanence, and transfer winding means coupled to each of said cores and to a fourth core for affecting the state of magnetic remanence of said fourth core in response to outputs from said first, second and third cores induced in said transfer winding upon operation of said means for driving, the sense of the winding of said transfer winding means on said cores being determined in accordance with the predetermined output function to be obtained.

2. A logical circuit arrangement for obtaining a predetermined output function of input variables comprising an input magnetic core for each of said input variables, an output magnetic core for said output function and a source magnetic core, said input, output and source magnetic cores each having a first state of magnetic remanence and a second state of magnetic remanence and being drivable therebetween, means for driving said source magnetic core to a predetermined one of its states of magnetic remanence, means for placing each of said input magnetic cores in a remanent state representative of an input variable, means for driving all of said input cores and said source core to their first state of magnetic remanence, and transfer winding means coupled on all of said magnetic cores with a sense for driving said output magnetic core to a state of remanence representative of said output function in response to outputs induced in said transfer winding due to operation of said means for driving.

3. A logical circuit arrangement for obtaining a predetermined output function of input variables as recited in claim 2 wherein each said input magnetic core comprises a multiaperture core having an output aperture, priming winding means for applying a priming magnetomotive force to the magnetic material of said input core surrounding said output apertures, and said source core comprises a toroidal core.

4. A logical circuit arrangement for obtaining an output function of input variables specified by $Z=X.Y$, said circuit arrangement comprising first and second input magnetic cores, a source magnetic core, an output magnetic core, said first and second input magnetic cores each having a clear state of magnetic remanence and a state of magnetic remanence respectively representative of input variables X and Y, said output magnetic core having a clear state of magnetic remanence and a state of magnetic remanence representative of output function Z, said source core having a clear state of magnetic remanence and a set state of magnetic remanence, means for driving said source core to its set state of magnetic remanence, means for applying signals representative of input variables to said first and second input cores for respectively driving said first and second input cores to states of magnetic remanence representative of said input variables, clear drive means for simultaneously driving said first and second input cores and said source core to their clear states of magnetic remanence, and transfer winding means coupled to all of said cores with a winding sense for driving said output core to its Z representative state of magnetic remanence in response to operation of said clear drive means only if said first and second cores are in their X and Y representative states at the time.

5. A logical circuit arrangement as recited in claim 4 wherein each said first and second input core is a multiaperture core having an output aperture therein, said source core comprises a toroidal core, said transfer winding is coupled to the first and second cores by passing through their respective output apertures with the same relative winding sense and is coupled to said source core by passing through its aperture with a relatively opposite winding sense whereby voltages induced into said transfer winding from the clear drive applied to the first and second cores add and oppose the voltage induced therein from said source core.

6. A logical circuit arrangement for obtaining an output function of input variables expressed by $Z=\overline{X}.\overline{Y}$, comprising first and second magnetic cores each having a clear state of magnetic remanence respectively representative of $\overline{X}$ and $\overline{Y}$ and a set state of magnetic remanence, an output magnetic core having a state of magnetic remanence representative of Z, a magnetic source core having a clear and a set state of magnetic remanence, means for applying a drive to said source core for placing it in its set state of magnetic remanence, means for applying first signals representative of input variables to said first and second cores to place said first and second cores in states of remanence representative of said input variables, clear drive means for applying a drive to said first, second and source cores to drive said first and second cores and said source core to their clear states of magnetic remanence, and a transfer winding coupled to all of said cores with a sense for driving said output core to its Z representative state of magnetic remanence only if said first and second cores were in their $\overline{X}$ and $\overline{Y}$ representative states of magnetic remanence at the time of the operation of said clear drive means.

7. A logical circuit arrangement as recited in claim 6 wherein said first and second cores each comprise a multiaperture core having an output aperture, said source core comprises a toroidal core, and said transfer winding is coupled to said first and second cores by passing through their output apertures with the same relative winding sense, said transfer winding is coupled to said source core with a relative winding sense and a number of turns such that the voltages induced in said transfer winding by either said first or said second core is equal and opposite to the voltage induced in said transfer winding from said source core, and the sense of the coupling of said transfer winding on said output core is such that said output core is driven to its Z representative state of magnetic remanence only in response to a voltage induced in said transfer winding from said source core alone being driven to its clear state from its set state.

8. A logical circuit arrangement for obtaining an output function of input variables expressed by $Z=\overline{X}+Y$, comprising first and second magnetic cores, a source magnetic core and an output magnetic core, said first magnetic core having a clear or $\overline{X}$ representative state of magnetic remanence and a set state of magnetic remanence, said second core having a Y representative state of magnetic remanence and a clear state of magnetic remanence, said source core having a clear and a set state of magnetic remanence, said output core having a Z representative state of magnetic remanence and another state of magnetic remanence, means for driving said source core to its set state of magnetic remanence, means for applying input signals to said first and second cores representative of input variables for driving them to their states of magnetic remanence representative of said input variables, clear driving means for driving said first, second and source cores respectively to their clear states of magnetic remanence, and transfer winding means coupled to all of said cores for driving said output core to its Z state of magnetic remanence in response to operation of said clear drive means only if said first core was in its $\overline{X}$ state of magnetic remanence at the time or said second magnetic core was in its Y state of magnetic remanence at the time.

9. A logical circuit arrangement as recited in claim 8 wherein said first and second magnetic cores comprise multiaperture cores having output apertures, said source core comprises a toroidal core, said transfer winding is coupled to said first and second cores by passing through their respective output apertures with a relatively opposite sense, said transfer winding is coupled to said toroidal core with a relative sense such that a voltage induced in said transfer winding from said source core adds to the voltage induced in said transfer winding from said second core and cancels the voltage induced in said transfer winding from said first core, and said transfer winding is coupled to said output core with a sense to drive said output core to its Z representative state in the presence of a voltage induced in said transfer winding from said source core alone or said source core and said second core.

10. A logical circuit arrangement for obtaining an output function of input variables expressed by $Z=\overline{X}+\overline{Y}$, comprising a first and second magnetic core, said first magnetic core having a clear or $\overline{X}$ representative state of magnetic remanence and another state of magnetic remanence, said second magnetic core having a clear or $\overline{Y}$ representative state of magnetic remanence and another state of magnetic remanence, a source core having a clear and a set state of magnetic remanence, an output core having a state of magnetic remanence representative of Z and another state of magnetic remanence, means for driving said source core to its set state of magnetic remanence, means for applying input signals to said first and second cores representative of input variables for driving said cores to states of magnetic remanence representative of said input variables, clear drive means for driving said first and second cores to their respective $\overline{X}$ and $\overline{Y}$ representative states of magnetic remanence and said source core to its clear state of magnetic remanence, and transfer winding means coupled to all of said cores for driving said output core to its Z representative state of magnetic remanence only if said first input core was in its $\overline{X}$ representative state of magnetic remanence or if said second input core was in its $\overline{Y}$ representative state of magnetic remanence at the time of said clear drive means operation.

11. A logical circuit arrangement as recited in claim 10 wherein said first and second magnetic cores are multiaperture cores each having an output aperture, said source core is a toroidal core, and said transfer winding is wound on said first and second cores by respectively passing through their output apertures with the same relative winding sense, said transfer winding is wound on said toroidal core with a winding sense to produce an induced voltage in said transfer winding which opposes the voltage induced therein from said first and second cores, the number of turns of said transfer winding on said source core provides an induced voltage in said transfer winding which is twice that induced in said transfer winding from either said first or said second core, and the sense of the coupling of said transfer winding on said output core is such as to cause said output core to be driven to its Z representative state of magnetic remanence only in response to a voltage having the polarity of the voltage induced in said transfer winding from said source core.

12. A logical circuit arrangement for obtaining an output function of input variables expressed by $$Z=X.Y+\overline{X}.\overline{Y}$$

said arrangement comprising a first magnetic core having an X representative state of magnetic remanence and an $\overline{X}$ representative state of magnetic remanence, a second magnetic core having a Y representative state of magnetic remanence and a $\overline{Y}$ state of magnetic remanence, a source core having a clear state of magnetic remanence and a set state of magnetic remanence, an output core having a clear state of magnetic remanence and a Z representative state of magnetic remanence, means for driving said source core to its set state of magnetic remanence, means for applying input signals to said first and second cores representative of input variables for driving said cores to states of magnetic remanence representative of said input variables, clear drive means for driving said first and second cores to their respective X and Y representative states of magnetic remanence and said source core to its clear state of magnetic remanence, and transfer winding means coupling all of said cores for driving said output core to its Z state of magnetic remanence if either both first and second cores were in their respective X and Y representative states of magnetic remanence or their respective $\overline{X}$ and $\overline{Y}$ representative states of magnetic remanence at the time of the operation of said clear drive means.

13. A logical circuit arrangement as recited in claim 12 wherein said first and second magnetic cores are multiaperture cores each having an output aperture, said source core is a toroidal core, said output core is a multiaperture core having an input aperture and a central aperture, said transfer winding is coupled to said first and second magnetic cores by passing through their output apertures with the same relative winding sense, said transfer winding is coupled to said source core with a winding sense such that a voltage is induced in said transfer winding from said source core which is equal and opposite to a voltage induced in said transfer winding from either said first or said second core, and said transfer winding is coupled to said output core by first passing through its input aperture, then through its output aperture, then back through its input aperture and out again.

14. A logical circuit arrangement for obtaining an output function of input variables expressed by $$Z=X.Y+\overline{X}.\overline{Y}$$

said arrangement comprising a first magnetic core having an X representative state of magnetic remanence and an $\overline{X}$ representative state of magnetic remanence, a second magnetic core having a Y representative state of magnetic remanence and a $\overline{Y}$ state of magnetic remanence, a source core having a clear state of magnetic remanence and a set state of magnetic remanence, an output core having a clear state of magnetic remanence and a Z representative state of magnetic remanence, means for driving said source core to its set state of magnetic remanence, means for applying input signals to said first and second cores representative of input variables for driving said cores to state of magnetic remanence representative of said input variables, clear drive means for driving said first and second cores to their respective $\overline{X}$ and $\overline{Y}$ representative states of magnetic remanence and said source core to its clear state of magnetic remanence, and transfer winding means coupling all of said cores for driving said output core to its Z representative state of magnetic remanence in response to a voltage induced in said transfer winding from said source core alone or from the combined source core and first and second cores.

15. A logical circuit arrangement as recited in claim 12 wherein said first and second magnetic cores are multiaperture cores each having an output aperture, said source core is a toroidal core, said output core is a multiaperture core having two input apertures and a central aperture, said transfer winding is coupled to said first and second magnetic cores by passing through their output apertures with the same relative winding sense, said transfer winding is coupled to said source core with a winding sense such that a voltage is induced in said transfer winding from said source core which is equal and opposite to a voltage induced in said transfer winding from either said first or said second core, and said transfer winding is coupled to said output core by first passing down through one of said input apertures and then up through said other of said input apertures, with a relatively opposite direction of winding sense.

16. A logical circuit arrangement for obtaining output function of input variables expressed by $Z=W.X.Y$, said circuit comprising first, second and third magnetic cores each having respectively a W, X and Y representative state of magnetic remanence and a clear state of magnetic remanence, a source core having a clear and a set state of magnetic remanence, an output core having a clear and a Z representative state of magnetic remanence, means for driving said source core to its set state of magnetic remanence, means for applying signals representative of input variables to said first, second and third cores for driving them to their clear or respective W, X, Y state of magnetic remanence in response to said signals, clear driving means for simultaneously driving said first, second, third cores and said source core to their clear states of magnetic remanence and transfer winding means inductively coupled to all of said cores for driving said output core to its Z representative state of magnetic remanence if said first, second and third cores were all in their respective W, X and Y representative states of magnetic remanence at the time of the application of said clear drive thereto.

17. A logical circuit arrangement as recited in claim 16 where said first, second and third cores each comprise a multiaperture core each having an output aperture, said source core comprises a toroidal core, said transfer winding couples to said first, second and third cores by passing through their output apertures with the same relative winding sense, said transfer winding couples to said source core with a winding sense and number of turns whereby a voltage is induced in said transfer winding from said source core having an amplitude which opposes and cancels the voltage induced in said transfer winding from any two of said first, second and third cores, and said transfer winding is coupled to said output core with a sense to drive it to its Z representative state of magnetic remanence in response to an uncancelled voltage from said first, second and third magnetic cores.

18. A logical circuit arrangement for obtaining more than one predetermined output function from input variables comprising an input magnetic core for each of said input variables, an output magnetic core for each desired predetermined function, a source magnetic core, said input, output and source magnetic cores each having a first state of magnetic remanence and a second state of magnetic remanence and being drivable therebetween, means for driving said source magnetic core to a predetermined one of its states of magnetic remanence, means for placing each of said input magnetic cores in a remanent state representative of an input variable, means for driving all of said input cores and said source core to their first states of magnetic remanence, first transfer winding means coupling said input magnetic cores and said source core to one of said output cores for driving said output magnetic core to a state of remanence representative of one of said output functions in response to outputs induced in said transfer winding due to operation of said means for driving, and second transfer winding means coupled to said first, second and said other of said output cores with a sense for driving said other of said output cores to a state of remanence representative of said other desired output function in response to outputs induced in said second transfer winding due to operation of said means for driving.

19. A logical circuit arrangement as recited in claim 18 wherein each of said input cores comprises a multiaperture core having an output aperture, said source core comprises a toroidal core, each of said first and second output cores comprises a multiaperture core having an input aperture and a central aperture, said first transfer winding is inductively coupled to said first and second cores by passing through their output apertures, the relative sense of coupling of said transfer winding to all of said cores being determined in accordance with the function desired, said second transfer winding also coupling to said first and second cores by passing through their output apertures and the sense of the coupling to said first and second cores, said source core, and said second output core of said second transfer winding being determined in accordance with the function desired to be performed.

No references cited.

BERNARD KONICK, *Primary Examiner.*

J. W. MOFFITT, *Assistant Examiner.*